(12) United States Patent
Sharma et al.

(10) Patent No.: US 11,516,693 B2
(45) Date of Patent: Nov. 29, 2022

(54) METHOD AND APPARATUS FOR MANAGEMENT OF EXTENDED MOBILE DEVICE IDENTITY INFORMATION

(71) Applicants: Sony Corporation, Tokyo (JP); Sony Mobile Communications Inc., Tokyo (JP)

(72) Inventors: Vivek Sharma, Basingstoke (GB); Svante Alnås, Lund (SE); Lars Nord, Lund (SE); Hideji Wakabayashi, Basingstoke (GB); Anders Berggren, Lund (SE); Yuxin Wei, Basingstoke (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 121 days.

(21) Appl. No.: 17/044,333

(22) PCT Filed: Mar. 26, 2019

(86) PCT No.: PCT/EP2019/057586
§ 371 (c)(1),
(2) Date: Oct. 1, 2020

(87) PCT Pub. No.: WO2019/192896
PCT Pub. Date: Oct. 10, 2019

(65) Prior Publication Data
US 2021/0160726 A1    May 27, 2021

(30) Foreign Application Priority Data

Apr. 4, 2018 (EP) .................................. 18165795

(51) Int. Cl.
*H04W 28/02* (2009.01)
*H04W 76/11* (2018.01)
(Continued)

(52) U.S. Cl.
CPC ......... *H04W 28/0226* (2013.01); *H04W 8/02* (2013.01); *H04W 8/26* (2013.01); *H04W 74/0833* (2013.01); *H04W 76/11* (2018.02)

(58) Field of Classification Search
CPC ..... H04W 28/0226; H04W 8/02; H04W 8/26; H04W 74/0833; H04W 76/11;
(Continued)

(56) References Cited

U.S. PATENT DOCUMENTS 8,886,183 B2   11/2014 Lindholm et al.
2009/0163211 A1   6/2009 Kitazoe et al.
(Continued)

FOREIGN PATENT DOCUMENTS

| EP | 2159972 B1 | 12/2012 |
| EP | 3293997 A1 | 3/2018 |
| WO | 2017/134856 A1 | 8/2017 |

OTHER PUBLICATIONS

Ahmadian, Zahra, Somayeh Salimi, and Ahmad Salahi. "New attacks on UMTS network access." 2009 Wireless Telecommunications Symposium. IEEE, 2009. (Year: 2009).*

(Continued)

*Primary Examiner* — Sharad Rampuria
(74) *Attorney, Agent, or Firm* — Xsensus LLP

(57) ABSTRACT

A method of operating a terminal device to establish a radio resource control connection with network infrastructure equipment in a wireless telecommunications network, wherein the terminal device is associated with a previously-allocated temporary identifier that identifies the terminal device within the wireless telecommunications network; the method comprising: transmitting a first message to the network infrastructure equipment comprising an indication of a first portion of the temporary identifier; and transmitting a second message, which is separate from the first message, (Continued)

to the network infrastructure equipment comprising an indication of a second portion of the temporary identifier.

30 Claims, 7 Drawing Sheets

(51) Int. Cl.
*H04W 8/02* (2009.01)
*H04W 8/26* (2009.01)
*H04W 74/08* (2009.01)

(58) Field of Classification Search
CPC .. H04W 76/10; H04W 84/18; H04L 61/6004; H04L 61/2092; H04L 61/6054; H04L 41/04; H04L 41/085; H04L 41/12; H04L 45/02
See application file for complete search history.

(56) References Cited

U.S. PATENT DOCUMENTS

| | | | |
|---|---|---|---|
| 2017/0303259 A1* | 10/2017 | Lee | H04W 28/16 |
| 2018/0376384 A1* | 12/2018 | Youn | H04W 36/14 |
| 2020/0359260 A1* | 11/2020 | Gao | H04W 28/06 |

OTHER PUBLICATIONS

Hammad, Abdulla A., Terence D. Todd, and George Karakostas. "Variable-bit-rate transmission schedule generation in green vehicular roadside units." IEEE Transactions on Vehicular Technology 65.3 (2015): 1590-1604. (Year: 2015).*
International Search Report and Written Opinion dated Jul. 3, 2019 for PCT/EP2019/057586 filed on Mar. 26, 2019, 9 pages.
3GPP TS 23.003 V15.2.0 (Dec. 2017).
3GPP TS 23.501 V15.0.0 (Dec. 2017).
ETSI TS 123 501 V15.2.1 (Jun. 2018), "System Architecture for the 5G System", 3GPP TS 23.501 version 15.2.0 Release 15.
Holma H. and Toskala A., "LTE for UMTS OFDMA and SC-FDMA based radio access", John Wiley and Sons, 2009.
New WID on Further NB-IoT enhancements #3GPP TSG RAN Meeting #75 RP-170852 Dubrovnik, Croatia, Mar. 6-9, 2017.
Revised work item proposal: Enhancements of NB-IoT 3GPP TSG RAN Meeting #73 RP-161901 New Orleans, USA, Sep. 19-22, 2016.
RP-161464, "Revised WID for Further Enhanced MTC for LTE," Ericsson, 3GPP TSG RAN Meeting #73, New Orleans, USA, Sep. 19-22, 2016.
RP-170732 New WI on Even further enhanced MTC for LTE.
Wiley LTE UMTS OFDMA and SC-FDMA Based Radio Access 2010 Holma and Toscada p. 25.

* cited by examiner

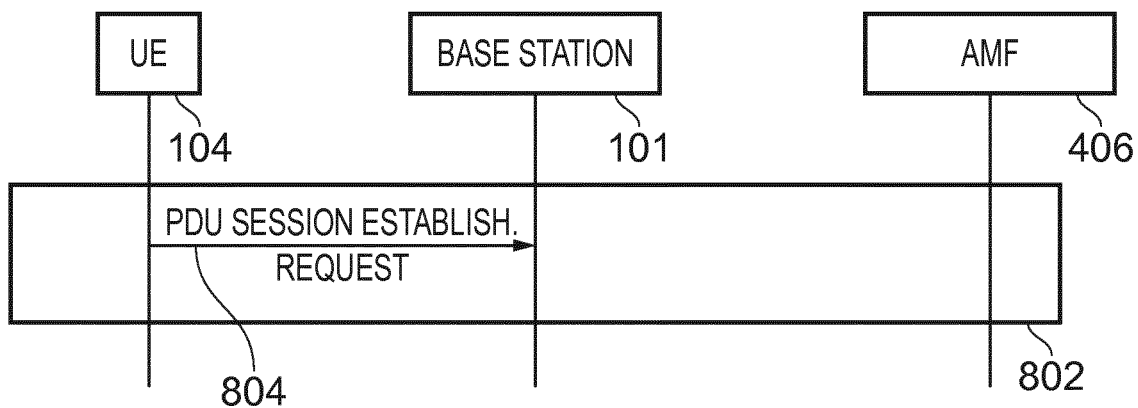
FIG. 8A
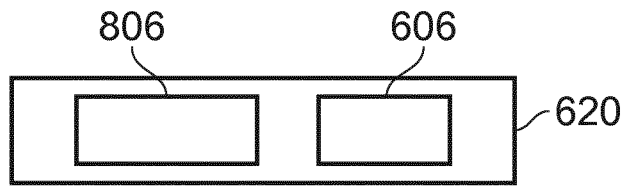
FIG. 8B
FIG. 8C

METHOD AND APPARATUS FOR MANAGEMENT OF EXTENDED MOBILE DEVICE IDENTITY INFORMATION

CROSS-REFERENCE TO RELATED APPLICATIONS

The present application is based on PCT filing PCT/EP2019/057586, filed Mar. 26, 2019, which claims priority to EP 18165795.8, filed Apr. 4, 2018, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data-rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected that future wireless communications networks will efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data. It is further expected some of these types of device may be required to operate in areas of relatively poor coverage, for example, in a basement or other location with relatively high penetration loss (e.g. for smart meter type applications), or in remote locations (e.g. for remote monitoring applications), and this has given rise to proposals for enhancing coverage, for example using repeat transmissions.

The increasing use of different types of terminal devices associated with different traffic profiles and requirements for coverage enhancement gives rise to new challenges for efficiently handling communications in wireless telecommunications systems that need to be addressed.

SUMMARY

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 8A illustrates a message sequence chart representing a sequence of transmissions for establishing a protocol data unit, PDU, session in accordance with embodiments of the present disclosure;

FIG. 8B illustrates a look-up table in accordance with certain embodiments of the present disclosure;

FIG. 8C illustrates the contents of a message in accordance with certain embodiments of the present disclosure.

DESCRIPTION OF EXAMPLE EMBODIMENTS

Figure 1:
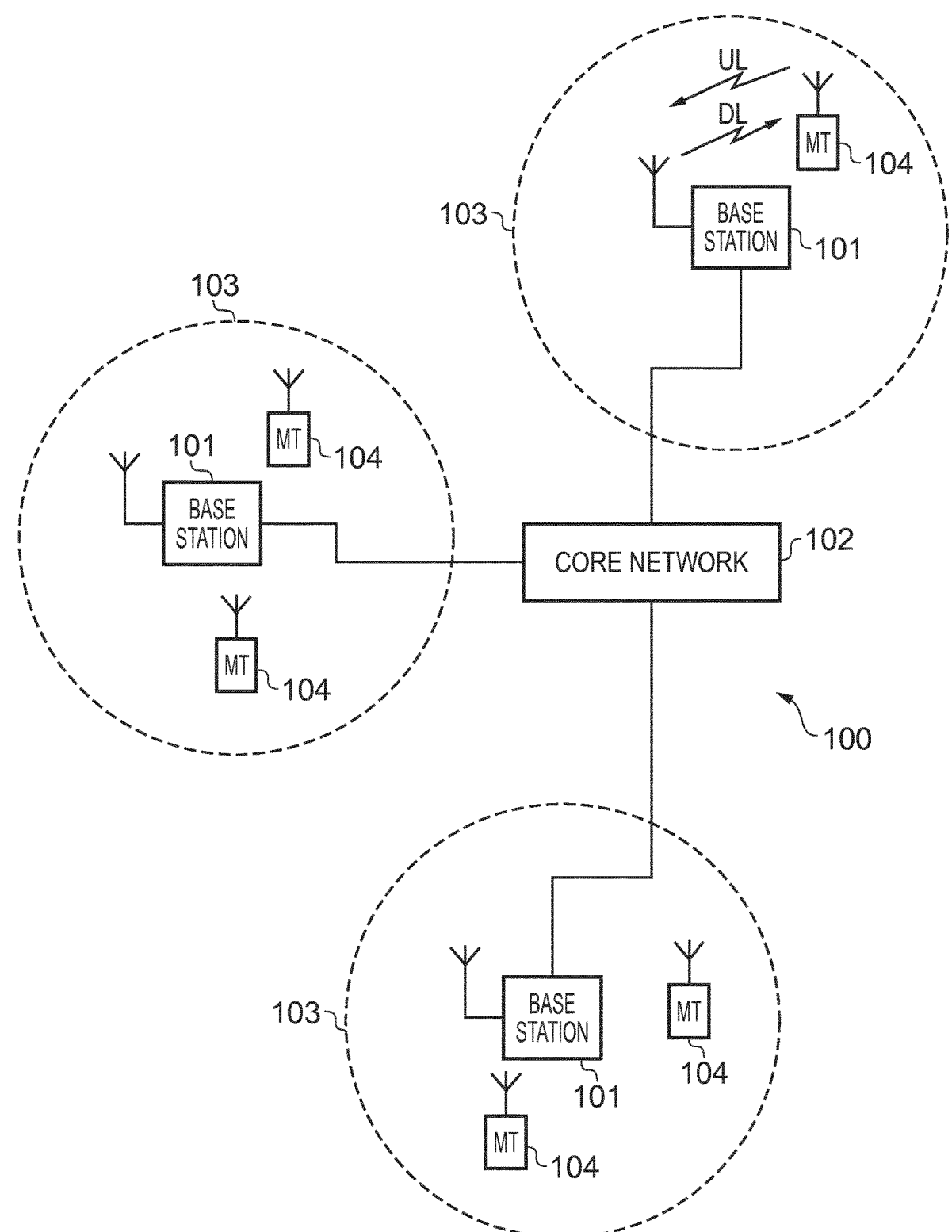
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink Data is transmitted from terminal devices 104 to the base stations 101 via a radio uplink The core network 102 routes data to and from the terminal devices 104 via the respective base stations 101 and provides functions such as authentication, mobility management, charging and so on. Terminal devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

While certain embodiments may be generally described herein in relation to the network architecture represented in FIG. 1, it will be appreciated corresponding approaches may equally be adopted in networks conforming to other overall configurations, for example configurations associated with proposed approaches for new radio access technology (RAT), NR, wireless mobile telecommunications networks/systems. A new RAT network may comprise communication cells that each comprise a controlling node in communication with a core network component and a plurality of distributed units (radio access nodes/remote transmission and reception points (TRPs)) within the cell. The distributed units may be responsible for providing the radio access interface for terminal devices connected to the NR network. Each distributed unit has a coverage area (radio access footprint) which together define the coverage of the communication cell. Each distributed unit includes transceiver circuitry for transmission and reception of wireless signals and processor circuitry configured to control the respective distributed units. In terms of broad top-level functionality, the core network component of such a new RAT telecommunications system may be broadly considered to correspond with the core network 102 represented in FIG. 1, and the respective controlling nodes and their associated distributed units/TRPs may be broadly considered to provide functionality corresponding to base stations of FIG. 1. Thus, the term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs. A terminal device operating in this proposed new RAT architecture may thus exchange signalling with a first controlling node via one or more of the distributed units associated with the controlling node. In some implementations the involvement of the distributed units in routing communications from the terminal device to a controlling node (controlling unit) may be transparent to the terminal device. It will further be appreciated that this example represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architecture shown in FIG. 1. It will be appreciated that the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node and/or a TRP in a new RAT architecture of the kind discussed above.

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in RRC idle mode to exchange data with a network involves the terminal device first performing an RRC connection procedure (random access procedure) with the network. The RRC connection procedure involves the UE initially transmitting a random access request message (which may be triggered autonomously by the UE determining it has data to transmit to the network or in response to the network instructing the UE to connect to the network). This is followed by RRC control message exchange between the network and UE. After establishing an RRC connection and exchanging the relevant data, the UE may then perform RRC disconnection and move back into idle mode for power saving. This conventional approach may for convenience be referred to herein as a legacy approach.

Figure 2:
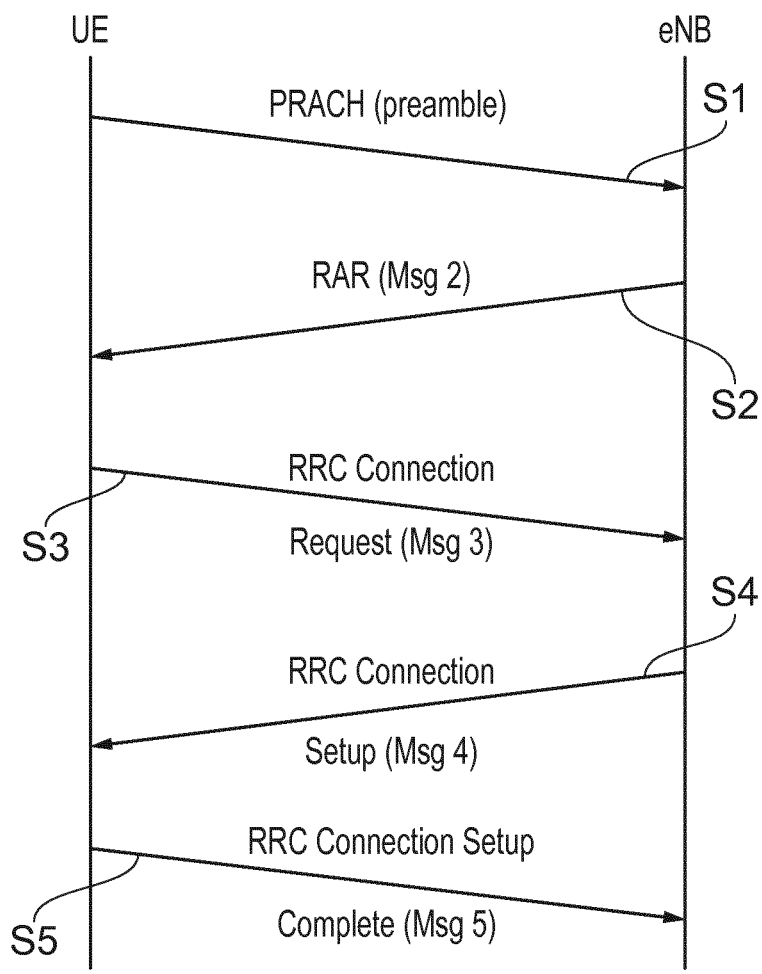
FIG. 2 schematically represents steps in a random access procedure in a wireless telecommunication network.

FIG. 2 is a ladder diagram that schematically shows message exchange between a UE and an eNB in a typical random access procedure to establish an RRC connection, in this example in an LTE-based network. The UE starts the process in step S1 by transmitting a random access request on a physical random access channel (PRACH in an LTE context), i.e. a random access preamble (RACH preamble), to the eNB. In step S2, when the eNB detects this preamble it will respond with a Random Access Response message (RAR), which is also known as Message 2. The RAR is scheduled by DCI (downlink control information) carried on a physical downlink control channel, e.g. MPDCCH in an LTE implementation for machine type communication (MTC) traffic, in a predefined Common Search Space (CSS). The RAR itself is transmitted on a physical downlink shared channel (PDSCH) resource allocated via the DCI. The DCI is addressed to an RA-RNTI (random access radio network temporary identifier) which is derived from the time and frequency resources used to transmit the preamble in step S1 and the RAR will indicate which preamble the eNB has detected and is responding to. It may be noted it is possible that multiple UEs may transmit a random access request using the same PRACH preamble and the same time and frequency resources. The RAR of step S2 also contains an uplink grant for the preamble the network is responding to so that the UE that transmitted the preamble may use this uplink grant to transmit an RRC Connection Request message, also known as Message 3 to the eNB, in step S3. Message 3 also contains an indication of an identifier for the UE (e.g. a C-RNTI (cell radio network temporary identifier) or TMSI (temporary mobile subscriber identity) or a 40-bit random number generated by the UE. The eNB will respond to Message 3, in step S4, with Message 4 which carries a RRC Connection Setup message. For the case where multiple UEs use the same preamble, the combination of Message 3 and Message 4 provides contention resolution functionality, for example using a terminal device identifier, such as C-RNTI or TMSI, transmitted in Message 3: when a UE receives a Message 4 that contains a portion of the Message 3 containing the temporary identity that it transmitted earlier, it knows that there was no contention on the Message 3 that it had transmitted. The RRC connection is established when the UE transmits Message 5 in step S5 containing a RRC Connection Setup Complete message.

In order to increase the number of terminal devices which are identifiable within a wireless telecommunications network, particularly in 5G networks, it has been proposed to increase the length of the TMSI, for example, from 40 to 48 bits. The inventors of the present technique have appreciated that including the longer TMSI within the message 3 at step S3 as described above may not be feasible, without compromising the reliability or cell coverage that can be achieved using a conventional TMSI.

In order to overcome the above problem, in embodiments of the present technique, only a portion (i.e. less than all) of the TMSI is included or indicated in the message 3. Additional information indicating the remainder of the TMSI (i.e. that portion not sent in message 3) is transmitted in message 5.

Figure 3:
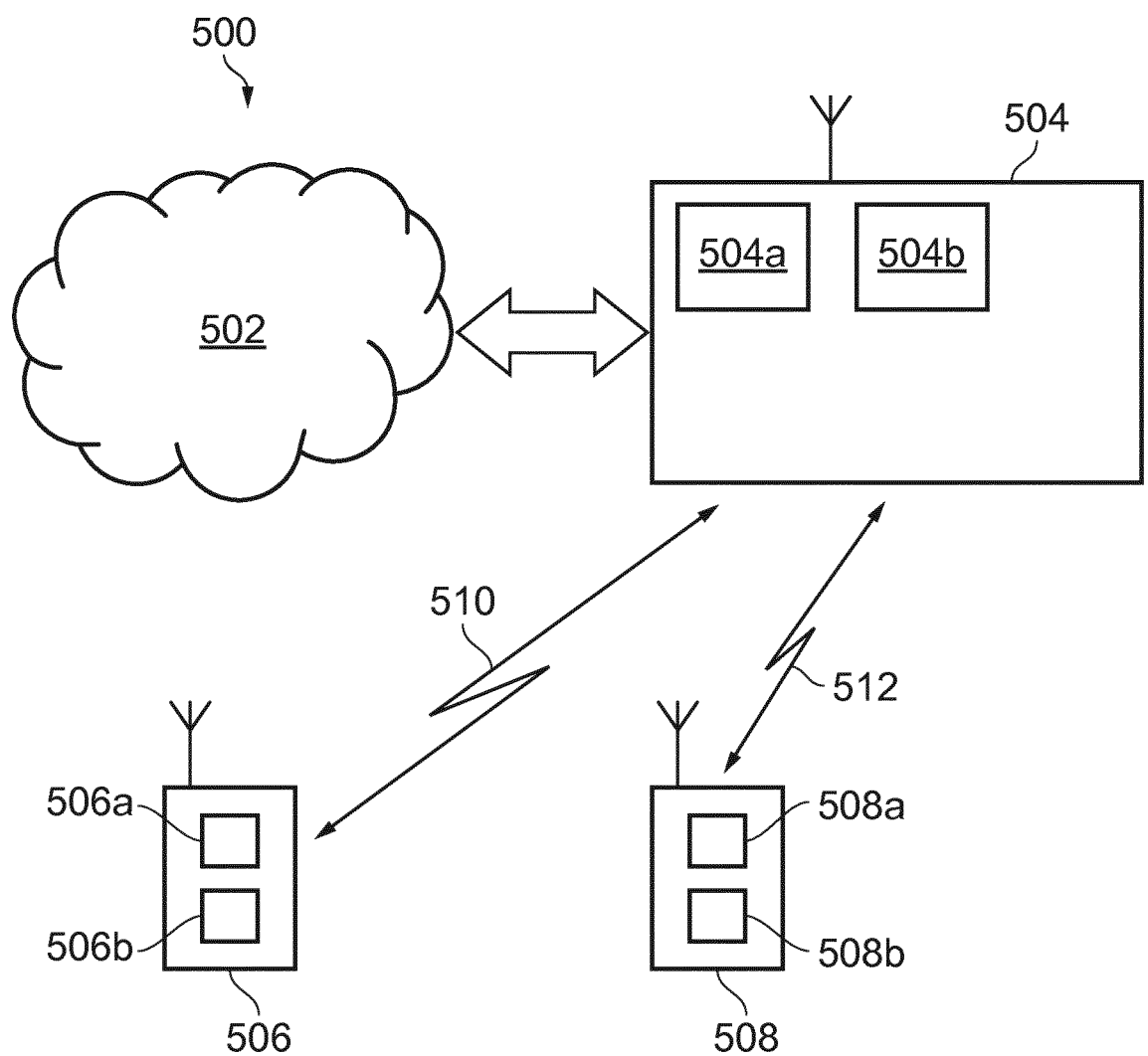
FIG. 3 schematically represents some aspects of a wireless telecommunication system in accordance with certain embodiments of the present disclosure.

FIG. 3 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 3 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service (EPS) connections with the terminal devices 506, 508 operating in the communications system based on subscriber information stored in a home subscriber server (HSS). Other network components in the core network (also not shown for simplicity) include a policy charging and resource function (PCRF) and a packet data network gateway (PDN-GW) which provides a connection from the core network part 502 to an external packet data network, for example the Internet. As noted above, the operation of the various elements of the communications system 500 shown in FIG. 3 may be broadly conventional apart from where modified to provide functionality in accordance with embodiments of the present disclosure as discussed herein.

The terminal devices 506, 508 comprise transceiver circuitry 506a, 508a (which may also be referred to as a transceiver/transceiver unit) for transmission and reception of wireless signals and processor circuitry 506b, 508b (which may also be referred to as a processor/processor unit) configured to control the devices 506, 508. The processor circuitry 506b, 508b may comprise various sub-units/sub-circuits for providing functionality as explained further herein. These sub-units may be implemented as discrete hardware elements or as appropriately configured functions of the processor circuitry. Thus the processor circuitry 506b, 508b may comprise circuitry which is suitably configured/programmed to provide the desired functionality using conventional programming/configuration techniques for equipment in wireless telecommunications systems. The transceiver circuitry 506a, 508a and the processor circuitry 506b, 508b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the terminal devices 506, 508 will in general comprise various other elements associated with its operating functionality, for example a power source, user interface, and so forth, but these are not shown in FIG. 3 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may comprise various sub-units/sub-circuits for providing desired functionality as explained further herein. These sub-units may be implemented as discrete hardware elements or as appropriately configured functions of the processor circuitry. Thus the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the base station 504 will in general comprise various other elements associated with its operating functionality.

Thus, the base station 504 is configured to communicate data with the terminal devices 506, 508 according to an embodiment of the disclosure over respective communication links 510, 512. The base station 504 is configured to communicate with the terminal device 506 over the associated radio communication link 510 and with the terminal device 508 over the associated radio communication link 512 generally following the established principles of LTE-based of 5G/NR communications, apart from using modified procedures in accordance with certain embodiments of the present disclosure as described herein.

In order to improve the flexibility and range of services that can be provided in a 5G network and to provide greater flexibility in terms of commercial relationships between network operators and customers, it has been proposed that a wireless telecommunication system may be logically divided into one or more network slices. This is illustrated in FIG. 4.

Figure 4:
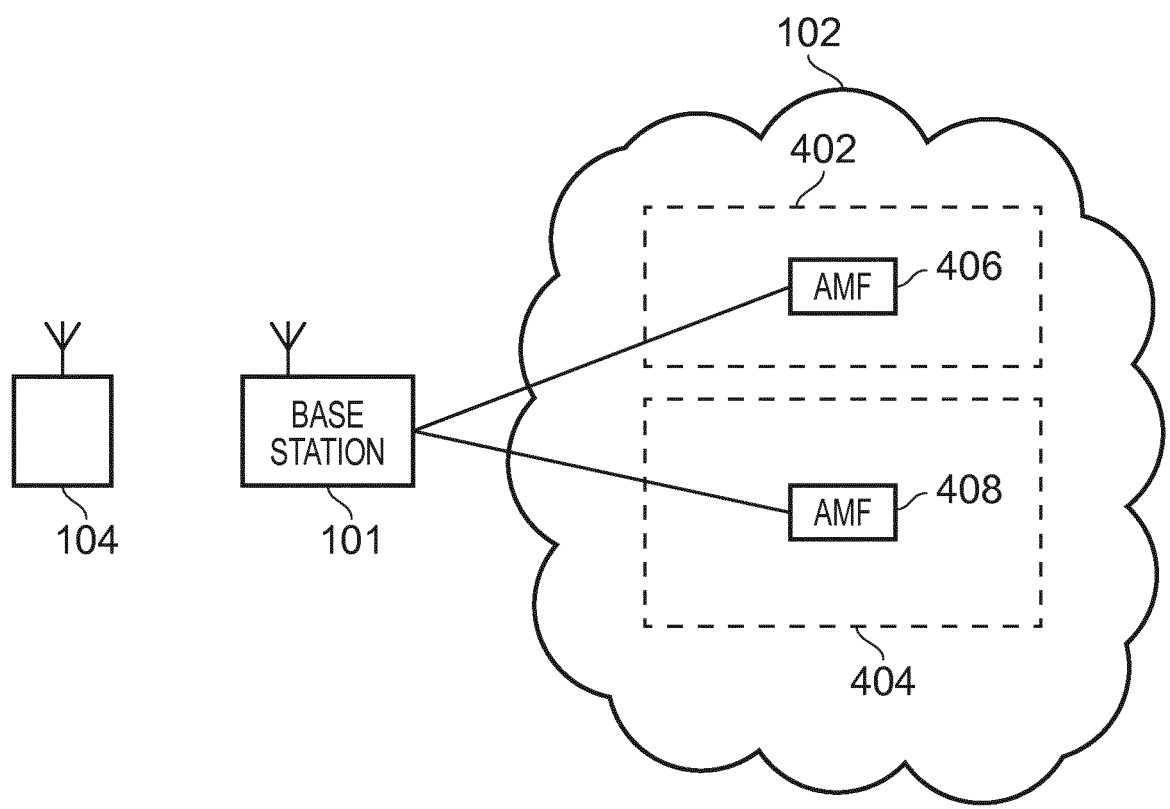
FIG. 4 schematically represents some aspects of a 5G-type wireless telecommunication system which may be configured to operate in accordance with certain embodiments of the present disclosure.

The core network 102 in FIG. 4 comprises two slices, a first slice 402 and a second slice 404. Each of the first and second network slices 402, 404 may include a respect access and mobility management function (AMF). For example, the first network slice 402 may include a first AMF 406 and the second network slice 404 may include a second AMF 408. The multiple network slices may each be connected to the radio access network such as the base station 101.

Within the radio access network, network slicing may be realised by means of resource partitioning or logical separation of communications resources such that each of the network slices 402, 404 have corresponding communications resources for use by the communication terminal 104 depending on the network slice with which it is communicating.

In order to facilitate the introduction of network slice functionality, each network slice is identified by network slice selection assistance information, NSSAI. A terminal device, such as the terminal device 104 may be configured to operate with, or subscribed to, one or more of the network slices provided by a wireless telecommunication system. A network slice to which a terminal device is subscribed may be identified by a single NSSAI (S-NSSAI). For example, in the wireless telecommunication system illustrated in FIG. 4, the terminal device 104 may be configured to access both the first network slice 402 and the second network slice 404. A given protocol data unit, PDU, session is associated with a single network slice. However, a terminal device such as the terminal device 104 may have simultaneous PDU sessions established with multiple network slices.

The S-NSSAI may comprise two portions: a slice service/type, SST, which indicates the features or services available from a given network slice, and a slice differentiator, SD, which differentiates among multiple network slices having the same slice/service type.

In the example wireless telecommunication of FIG. 4 each of the first and second network slices 402, 404 are shown to have their own associated AMF, 406, 408 respectively. However in some network typologies an AMF may be shared by multiple network slices.

A terminal device (such as the terminal device 104) may be configured to associate certain applications running on a processor of the terminal device with a particular network slice, or with a particular network slice service and/or type.

In order to accommodate the introduction of network slice functionality, it has been proposed that the message 5, which is sent in step S5 of FIG. 2, may include a list of network slice identifiers with which the terminal device is currently associated.

Figure 5:
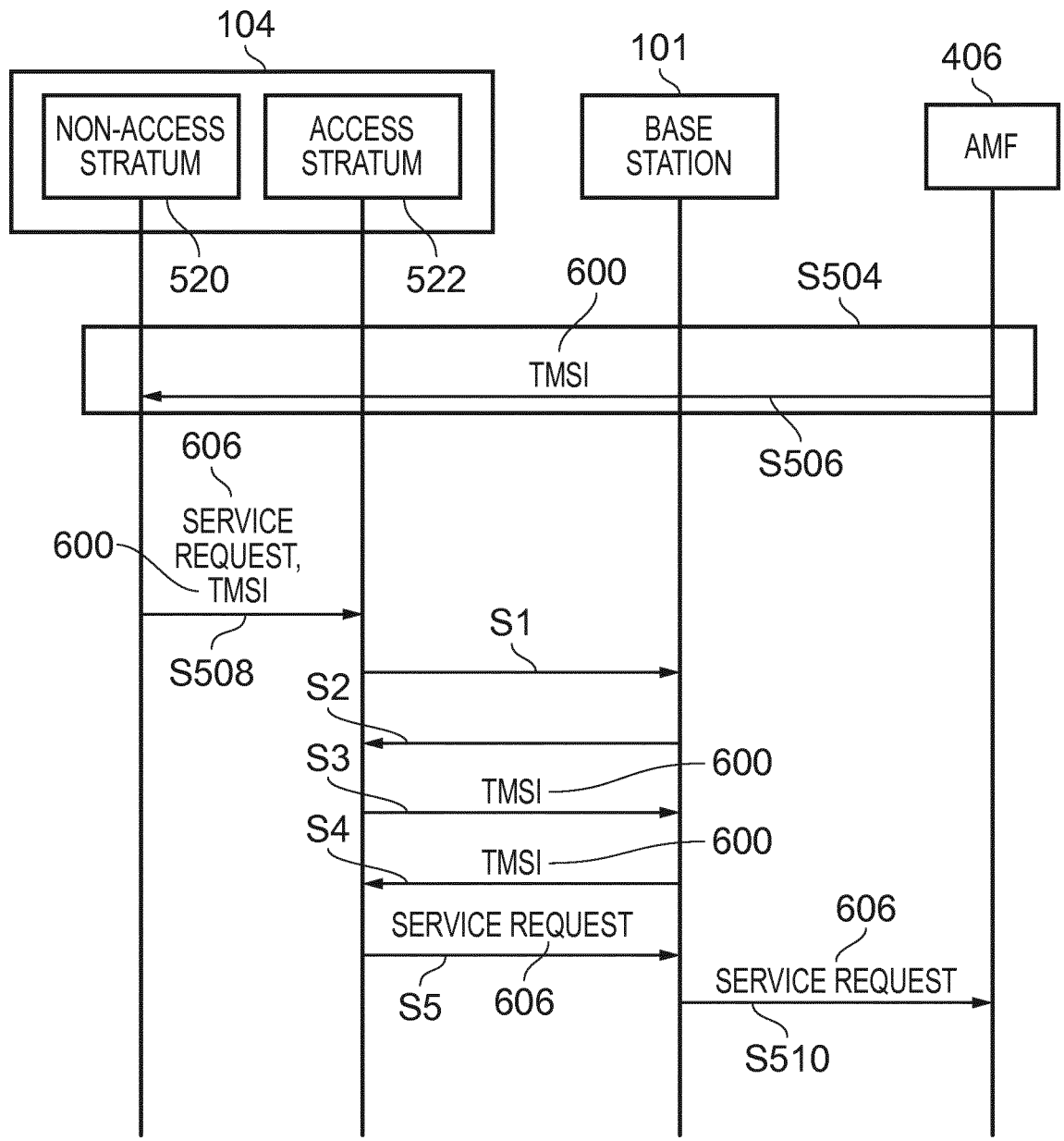
FIG. 5 is a message sequence chart representing a sequence of transmissions which may be carried out in accordance with certain embodiments of the present disclosure.

FIG. 5 is a message sequence chart illustrating transmissions which may be in accordance with examples of the present technique, between a terminal device, such as the terminal device 104, a base station or eNodeB, such as the base station 101, and an AMF, such as the AMF 406 of FIG. 4. For clarity the terminal device 104 is shown as comprising a non-access stratum (NAS) protocol entity, 520 and an access stratum (AS) entity, 522. This distinction is shown merely for clarity and the example embodiments described here are not limited to such a terminal device implementation.

The message exchange starts at step S504 which represents an attach procedure between the terminal device 104 and the AMF 406. The details of the attach procedure may be in accordance with a conventional process for attaching with a core network. As part of the attach procedure S504, a temporary identifier, which may be the temporary identity 600, is allocated by the AMF 406 to the terminal device 104. This may be for example a temporary mobile subscriber identity (TMSI) and more specifically, in the case where the AMF is in a 5G core network, this may be a 5G-S-TMSI. In the case where the core network is an enhanced packet core (EPC) network, the temporary identity 600 may be a system architecture evolution (SAE) TMSI, S-TMSI. The temporary identity 600 may be 40 bits in length or, in some embodiments of the present technique, may be 48 bits long or longer. The use of a temporary identifier having a greater length (such as 48 bits) may permit a much greater number of core network entities or a greater density of terminal devices, and/or accommodate a large number of network slices within a wireless telecommunications network.

The temporary identity 600 may comprise one or more portions which together identify an entity with the core network 102. For example, the temporary identity 600 may comprise an AMF Set ID and an AMF Pointer which together identify an AMF, such as the AMF 406, within the core network 102. The temporary identity 600 may further comprise an identifier (which may be, for example, a 5G-TMSI) which uniquely identifies the terminal device 104 amongst all terminal devices associated with the core network entity, such as the AMF 406.

Subsequently at step S508 the NAS entity 520 of the terminal device 104 sends a service request 606 to the access stratum (AS) entity 522 of the terminal device 104. For example the service request 606 may be in response to a user-initiated interaction with the terminal device 104 such as requesting an internet connection or initiating a voice call. The service request 606 may be provided to the access stratum 522 together with the temporary identity 600.

In response to receiving the service request S508, the access stratum 522 initiates an RRC connection establishment procedure. The RRC connection establishment procedure may follow steps S1, S2, S3, S4, S5 as illustrated in FIG. 2 and described above.

The RRC Connection request (message 3, sent at step S3) may have a predetermined size, or may have a predetermined maximum size. In FIG. 5, it is shown that, in accordance with conventional techniques, the entire temporary identity 600 may be included in the message 3. However, in some embodiments of the present technique, as will be described below in greater detail, only a portion of the temporary identity 600 may be included in the message 3. This may be because the maximum size of the message 3 is not sufficient to allow for the inclusion of the entire temporary identity 600. In some embodiments, the length of the message 3 is predetermined, and the size of the portion of the temporary identity which is indicated in the message 3 is accordingly predetermined.

In some embodiments of the present technique, however, the terminal device 104 determines a size of the portion of the temporary identity 600 to include in the message 3, based on a determination of the size of the message 3.

According to conventional techniques, then, because the terminal device 104 has been allocated the temporary identity 600 by the AMF 406, the temporary identity 600 is included in the message 3 at step S3 as described above and is therefore used in the contention resolution procedure. That is, in order to identify which terminal device the base station 101 is establishing a connection with, the message S3 includes the temporary identity 600 which is subsequently included in the RRC connection setup message, S4, transmitted by the base station 101. This avoids any confusion by the terminal device 104 as to whether or not the base station 101 is responding to its message 3 or to that of another terminal device which may have transmitted a message identical to the RRC connection request message S1 at the same time as the transmission of the RRC connection request message S1.

As described above, in some embodiments of the present technique, an indication of a first portion of the temporary identity 600 is included in the message 3 at step S3. As such, no indication of the complete temporary identity 600 is included in the message 3. The contention resolution process may therefore, in some embodiments, be based on the use of some or all of the portion of the temporary identity 600 which is included in the message 3.

After the contention resolution procedure is complete, the terminal device 104 at step S5 transmits in the message 5 the service request 606 which was received in step S508 from the NAS entity 520 by the access stratum entity 522. In a wireless telecommunications network having multiple network slices, the message 5 may further comprise slice identity information.

According to some embodiments of the present technique, the message 5 may comprise an indication of a second portion of the temporary identity 600. In some embodiments of the present technique, the length of the message 5 is not predetermined.

As described above, the temporary identity 600 which was issued by the AMF 406 in the attach procedure may comprise an indication of the identity of the AMF 406. As such, or based on any suitable pre-configuration, the base station 101, having received the temporary identity 600 at step S3 may, according to conventional techniques, identify the AMF 406 to which the terminal device 104 is attempting to transmit the service request 606. In response to receiving the message 5 at step S5 the base station 101 is thus able to identify the AMF 406 and therefore to transmit the service request to the AMF 406 at step S510.

From the above description it will be apparent that the temporary identity 600 allocated by the AMF 406 may in fact have multiple purposes. Specifically, the temporary identity 600 may first identify the terminal device 104 within the wireless telecommunications network thereby permitting subsequent paging or connection establishment with the terminal device 104.

In addition, the temporary identity 600 provides a means for the contention resolution procedure, comprising steps S3 and S4. Finally the temporary identity 600, comprising a portion which permits the base station 101 to identify an AMF within the core network 102, enables the base station 101 to route the service request to the appropriate AMF as illustrated in step S510 above.

The inventors of the present technique have recognised, inter alia, that, in accordance with embodiments of the present technique described herein, two or more of these different requirements can be satisfied while meeting a constraint on the length of the message 3 transmitted at step S3, which may prevent the entire temporary identity 600 being included in the message 3.

In accordance with example embodiments of the present technique, the sequence of messages represented in FIG. 5 may be adapted, as will be described below. However, it will be readily apparent that the techniques described herein are not limited to the scenario illustrated in FIG. 5.

For example, although in the message sequence of FIG. 5 the service request 606 is sent from the NAS 520 to the AS 522, the techniques disclosed herein are not so limited, and may be applied as a result of a request of a different nature sent from the NAS 520 to the AS 522, or may be carried out autonomously by the AS 522, absent any request from the NAS 520. In some embodiments of the present technique, including those in which no NAS-originated message is to be transmitted to the core network 102, step s510 may be omitted.

Some example embodiments of the present technique thus provide a means for a base station 101 to derive a temporary identity 600 of a terminal device 104. Some example embodiments of the present technique provide, additionally or alternatively, a means for a base station 101 to perform contention resolution using at least a portion of the temporary identity 600 and to identify a core network entity to which a further transmission may be directed.

In particular, in some embodiments of the present technique, it is not necessary for the base station 101 to determine the complete temporary identity 600 of the terminal device 104.

For example, in some embodiments, the base station 101 determines, based on one or both of the portion of the temporary identity 600 which is included in the message 3, and the additional information included in the message 5, the identity of the core network entity to which it should transmit subsequently (e.g. in order to forward a NAS message which was included in the message 5).

In some embodiments, the complete temporary identity 600 is, additionally, included within a NAS container (which may include, for example, the service request 604) which is transmitted transparently via the base station 101, without the base station 101 parsing or otherwise determining the information contained within the container. In such cases, the base station 101 determines the identity of the core network entity, such as the AMF 406 to which the NAS container is to be transmitted and transmits the NAS container accordingly. The core network entity (such as the AMF 406) receives the NAS container and decodes it, thereby determining the temporary identity 600 of the terminal device 104.

In other embodiments, the base station 101 determines the complete temporary identity 600 in accordance with one or more approaches described herein, and may include the temporary identity 600 in the message (such as the message 510) which is transmitted to the core network. In some embodiments, the base station 101 in accordance with one or more of the approaches described herein, determines the complete temporary identity 600 and associates it with the established RRC connection. The base station 101 may subsequently transmit the complete temporary identity 600 as part of a procedure to hand over, or otherwise facilitate the mobility of, the terminal device 104. In some embodiments, therefore, the base station 101 may not determine the identity of a core network entity.

Figure 6:
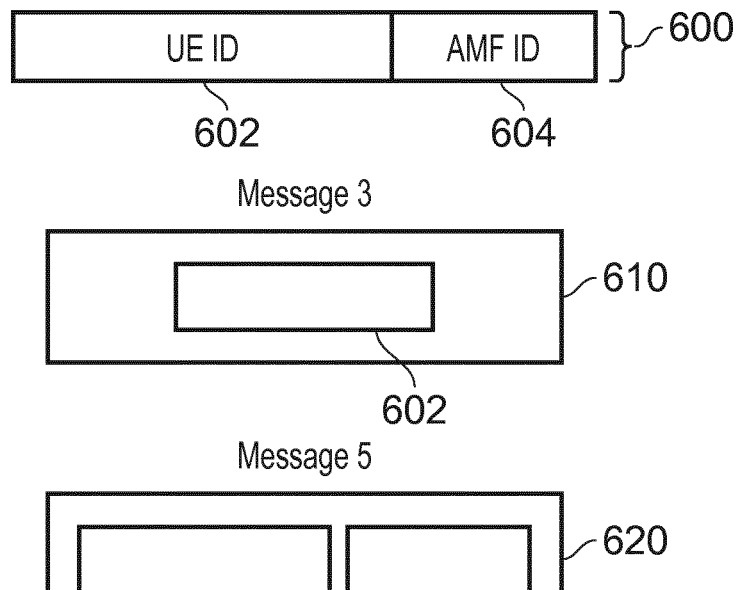
FIG. 6 illustrates a temporary identity and the contents of messages formed in accordance with certain embodiments of the present disclosure.

In an embodiment of the present technique, the temporary identity 600 comprises a user equipment (UE) ID portion 602 and an AMF ID portion 604, as depicted in FIG. 6. The size of the UE ID portion 602 is such that it can fit within the message 3 610. According to such embodiments of the present technique, the message 3 610 includes the UE ID portion 602 of the temporary ID and thus the UE ID portion 602 may be used for the contention resolution part of the random access procedure.

After the contention resolution procedure, the message 5 620 is transmitted from the UE 104 to the base station 101 containing the AMF ID portion 604. In some embodiments of the present technique the message 5 620 further includes the service request 606 which was received from the UE's NAS entity 520 by the UE's AS entity 522.

In some embodiments of the present technique, the AMF ID portion 604 comprises one or more of an AMF set ID or an AMF region ID.

In some embodiments the temporary identity 600 comprises an indication of a region in which the terminal device 104 is currently registered, in addition to, or in combination with the AMF ID portion 604. For example, the indication of the region may be a tracking area identity (TAI). Accordingly, within the message 5 620, the tracking area identity may be included. In some embodiments, the TAI is configured according to a policy of the operator of the wireless telecommunications system. The base station 101 may be configured using, for example, operation and maintenance techniques, with a mapping between TAI and AMF ID. As such, the base station 101 may determine the AMF ID, such as the identity of the AMF 406, based on the TAI provided in the message 5 620.

In a further embodiment of the present technique the message 5 620 comprises an indication of a network slice identifier 608. The message 3 610 contains the UE ID portion 602 as before, and the message 5 620 includes an indication of a network slice identifier 608. The indication of the network slice identifier 608 may comprise an S-NSSAI, or a list of S-NSSAI's 618.

According to some embodiments of the present disclosure the network slice indication 608 comprises a list of S-NSSAI's 618, and the S-NSSAI to be associated with the UE ID portion 602 is the one in a predetermined position, for example, the S-NSSAI 618a in a first position in the list. In some embodiments of the present technique, the S-NSAIs 618a, 618b, 618c in the list of S-NSSAIs 618 are ordered according to when the terminal device 104 was most recently connected to the respective network slice. For example, the first S-NNSAI 618a may correspond to the network slice to which the terminal device 104 was most recently connected, and so on.

In some embodiments of the present technique, the network slice indication 608 in the message 5 620 may indicate the identity of a slice to which the terminal device 104 wishes to connect (for example, the slice to which the terminal device 104 to which the base station 101 is to transmit the service request 606). As such, in some such embodiments, the network slice indication 608 in the message 5 620 may indicate the identity of a slice which does not contain the AMF 406 from which the temporary identity 600 was received.

In some embodiments of the present technique the base station 101 is configured to store an association between network slice identifiers and the identities of an AMF entity within the corresponding slice. For example, the base station 101 may store in memory an AMF ID table 702 in which each of one or more S-NSSAIs are associated with an AMF ID.

As such, in response to receiving the message 3 610 and the message 5 620 containing the indication of the network slice identifier 608, the base station 101 derives first an S-NSSAI and, based on the configured mapping between S-NSSAIs and AMF identities, determines the contents of the AMF ID portion 604. Based on the determined AMF ID portion 604 the base station 101 transmits the service request 606 to the identified AMF function within the appropriate network slice. For example, the S-NSSAI in the first position 618a of the list of NSSAI's 608 may indicate the identity of the network slice 402 illustrated in FIG. 4. The base station 101 may thus identify the AMF 406 based on receiving the identity of the network slice 402 in the message 5 620.

In some embodiments of the present technique, the UE ID portion 602 may comprise a conventional S-TMSI or 5G-S-TMSI. As such, or in any case, the UE ID portion 602 may include an indication of the identity (for example, in the form of an AMF set ID and/or an AMF pointer) of the core network entity from which the TMSI was obtained, or to which the terminal device 104 is attempting to connect or re-connect.

A further embodiment of the present technique is illustrated in FIG. 8A, FIG. 8B and FIG. 8C. FIG. 8 shows a protocol data unit, PDU session establishment process 802 by which the UE 101 establishes via the base station 101 a PDU session with the AMF 406. The PDU establishment process may proceed according to a conventional approach and for clarity, not all messages within the process are shown in FIG. 8.

The PDU establishment process 802 may comprise the transmission by the UE 101 to the base station 101 of a PDU session establishment request message 804. The PDU session establishment request message 804 may comprise a PDU session ID and an identity (for example, an S-NNSAI) of a network slice with which the UE 101 wishes to establish a PDU session.

As part of the PDU session establishment process 802, the base station 101 may thus determine an association between an identity of the UE 101, the PDU session ID and the identity of the network slice associated with the PDU session. The base station 101 may, for example, store such association in a table having the form of a PDU session table 808 illustrated in FIG. 8B. In accordance with some embodiments of the present technique, the PDU session ID may be indicated to the base station 101 in a manner that does not require the base station 101 to decode message contents which are generated by, or for, a non-access stratum protocol entity. For example, the PDU session ID may be included in the access stratum portion of the message which comprises the PDU session establishment request message 804.

Subsequently according to embodiments of the present technique, the message 3 610 may comprise the UE ID portion 602 of the temporary identity. As illustrated in FIG. 8C, the message 5 620 may comprise an indication 806 of the identity of the PDU session which was established in the PDU session establishment process 802. In accordance with some embodiments of the present technique, the PDU session ID may be included in the message 5 620 in a manner that does not require the base station 101 to decode message contents which are generated by, or for, a non-access stratum protocol entity. For example, the PDU session ID may be included in the portion (which may be an access stratum portion) of the message 5 620 which is to be decoded by the base station 101.

Figure 7:
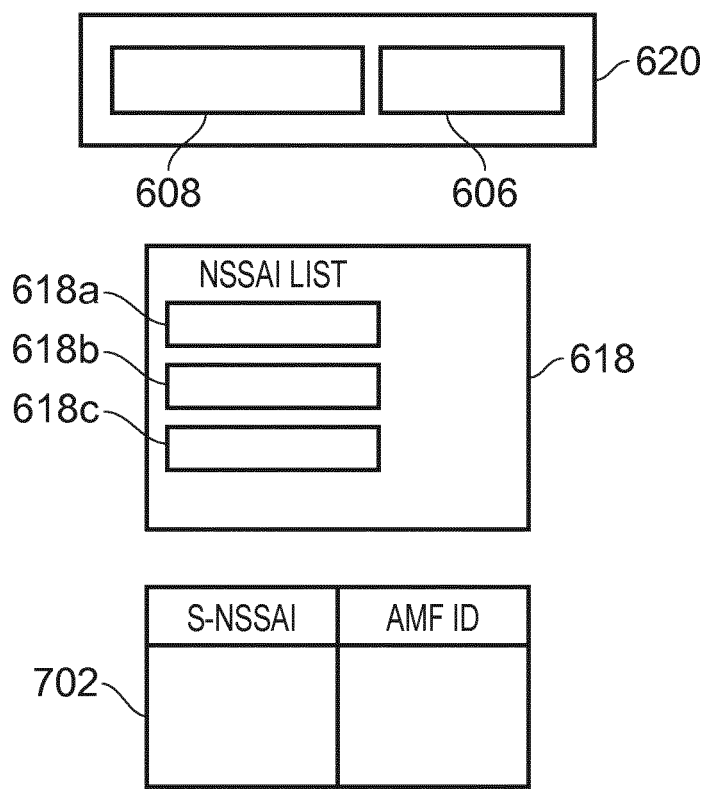
FIG. 7 illustrates messages, their contents and a look-up table in accordance with certain embodiments of the present disclosure.

In some embodiments, the message 5 620 may comprise the indication 608 of the identity of the network slice with which the PDU session was established in the PDU session establishment process 802. (The indication 608 may be of a form described above in respect of FIG. 7).

For example, the indication 806 may comprise the PDU session ID indicated in the transmission 804 of the PDU session establishment 802. Based on the stored association between the identity of the UE 101, the identity of the PDU session, and the identity of the network slice, the base station 101 determines the identity of the network slice and, based on a stored association between the network slice identity and the identity of the AMF 406 (which may be, for example, in the form of the AMF ID table 702), is able to transmit the service request 606 to the AMF 406.

In some embodiments, the NAS layer 520 in the UE 104 handles a mapping between the PDU session ID and the order of slices whose identities are included in the list 618 of slice identifiers. This approach allows a dynamic change of the mapping between PDU session identifier and slice identifier.

In other embodiments, the NAS entity 520 provides the list 618 of slice identifiers and the PDU session ID to the AS layer 522 of the terminal device 104, and the AS layer 522 performs the mapping, to generate the list 618 of slice identifiers or the indication 608 of the identity of the network slice.

In other embodiments, the AS layer 522 includes an indication of the PDU session ID in the message 5 620 and the base station 101, having stored previously a mapping from the PDU session ID to the identity of the network slice, determines the identity of the network slice based on the PDU session ID indicated in the message 5 620.

In some embodiments, the message 5 620 may include one or both of an indication of the PDU session ID and an indication of the identity of the network slice, thereby providing greater flexibility and permitting a dynamic mapping between PDU session ID, network slice and AMF ID.

As described above, various approaches have been described which address the various problems resulting from the use of a temporary identity 600 which exceeds the available capacity of the message 3 610.

According to some embodiments of the present technique, in order to provide suitable flexibility and to accommodate various network deployment scenarios, the terminal device 104 may indicate, for example by means of an indication included in the message 5 as to which approach has been used, or in other words, an indication of how the base station 101 is to determine the complete temporary identity 600 and/or the identity of the core network entity (such as the AMF 406) to which any subsequent transmission by the base station 101 is to be directed.

In some embodiments of the present technique, the method by which the terminal device constructs the message 3 610 and the message 5 620 so as to enable the base station 101 to determine the complete temporary identity 600 and/or the identity of the core network entity, is indicated in a message transmitted by the base station 101, for example in broadcast system information. Alternatively, such an indication may be transmitted as part of non-access stratum signalling, for example as part of the PDU session establishment procedure 802.

In some embodiments of the present technique, the same method is used regardless of whether the wireless access interface provided by the base station 101 is compliant with the LTE specifications or with the NR specifications.

In yet some further embodiments of the present technique, a first method is used if the wireless access interface provided by the base station 101 is compliant with the LTE specifications, and a second method is used if the wireless access interface provided by the base station 101 is compliant the NR specifications.

The inventors of the present disclosure further recognise that the various approaches described herein may permit, in some embodiments, the size of the message 3 610 to be reduced, compared to conventional message 3 formats. For example, in some embodiments, the UE ID portion 602 may be only 32 bits long, and the message 3 610 may be accordingly formatted so that only 32 bits of a temporary identity may be included. In such embodiments, various well-known techniques (for example, more robust encoding) may be used to increase the coverage area from within which the message 3 610 may be reliably received by the base station 101.

Thus there has been described a method of operating a terminal device to establish a radio resource control connection with network infrastructure equipment in a wireless telecommunications network, wherein the terminal device is associated with a previously-allocated temporary identifier that identifies the terminal device within the wireless telecommunications network; the method comprising: transmitting a first message to the network infrastructure equipment comprising an indication of a first portion of the temporary identifier; and transmitting a second message, which is separate from the first message, to the network infrastructure equipment comprising an indication of a second portion of the temporary identifier.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a terminal device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device to establish a radio connection with network infrastructure equipment in a wireless telecommunications network, wherein the terminal device is associated with a previously-allocated temporary identifier that identifies the terminal device within the wireless telecommunications network; the method comprising: transmitting a first message to the network infrastructure equipment comprising an indication of a first portion of the temporary identifier; and transmitting a second message, which is separate from the first message, to the network infrastructure equipment comprising an indication of a second portion of the temporary identifier.

Paragraph 2. A method according to paragraph 1, wherein the second message comprises a request for a service from a core network of the wireless telecommunications network.

Paragraph 3. A method according to paragraph 1 or paragraph 2, wherein the first message is transmitted as part of a random access contention resolution procedure.

Paragraph 4. A method according to any of paragraphs 1 to 3, wherein the second message is transmitted after the completion of a contention resolution procedure.

Paragraph 5. A method according to any of paragraphs 1 to 4, wherein the size of the first message is predetermined, and the size of the second message is greater than the size of the first message and is not predetermined.

Paragraph 6. A method according to any of paragraphs 1 to 5, wherein the second message is an RRC connection setup complete message.

Paragraph 7. A method according to any of paragraphs 1 to 6, wherein the second message comprises a list of one or more network slice identifiers, and the indication of the second portion of the temporary identifier comprises a network slice identifier at a predetermined position in the list.

Paragraph 8. A method according to paragraph 7, wherein the network slice identifier at the predetermined position in the list is associated with an access and mobility management function, AMF, in a core network of the wireless telecommunications network with which the terminal device has established a protocol data unit, PDU, session.

Paragraph 9. A method according to any of paragraphs 1 to 8, wherein the second message comprises a indication of a protocol data unit, PDU, session identity, and the indication of the second portion of the temporary identifier comprises the indication of a protocol data unit, PDU, session identity.

Paragraph 10. A method according to any of paragraphs 1 to 6, wherein the indication of the second portion of the temporary identifier comprises one of a tracking area identifier, an identifier of an access and mobility management function, AMF, in a core network of the wireless telecommunications network with which the terminal device is registered, and an identifier of a group of access and mobility management functions, the group including the access and mobility management function with which the terminal device is registered.

Paragraph 11. A method according to any of paragraphs 1 to 10, the method comprising: transmitting a random access request message on a random access channel to the network infrastructure equipment of the wireless telecommunications network, and receiving a random access response message from the network infrastructure equipment, wherein the first message is transmitted in response to receiving the random access response message.

Paragraph 12. A method according to any of paragraphs 1 to 11, further comprising the terminal device determining a size for the indication of the first portion of the temporary identifier based on a size of the first message.

Paragraph 13. A method according to any of paragraphs 1 to 12, wherein the temporary identifier is one of a system architecture evolution-temporary mobile subscriber identity, S-TMSI, and a 5G-S-TMSI, comprising at least 48 bits.

Paragraph 14. A method of operating a network infrastructure equipment of a wireless telecommunications network to establish a radio connection with a terminal device, wherein the terminal device is associated with a previously-allocated temporary identifier that identifies the terminal device within the wireless telecommunications network, the method comprising: receiving a first message from the terminal device comprising an indication of a first portion of the temporary identifier; and receiving a second message, which is separate from the first message, from the terminal device comprising an indication of a second portion of the temporary identifier.

Paragraph 15. A method according to paragraph 14, wherein the first message is transmitted as part of a random access contention resolution procedure.

Paragraph 16. A method according to paragraph 14 or paragraph 15, wherein the second message is transmitted after the completion of a contention resolution procedure.

Paragraph 17. A method according to any of paragraphs 14 to 16, wherein the size of the first message is predetermined, and the size of the second message is greater than the size of the first message and is not predetermined.

Paragraph 18. A method according to any of paragraphs 14 to 17, wherein the second message is an RRC connection setup complete message.

Paragraph 19. A method according to any of paragraphs 14 to 18, wherein the second message comprises a request for a service from a core network of the wireless telecommunications network.

Paragraph 20. A method according to paragraph 19, the method comprising: determining an identity of an access and mobility management function, AMF, in the core network based on the indication of the first portion of the temporary identifier and the indication of the second portion of the temporary identifier, and transmitting the request for the service to the identified access and mobility management function.

Paragraph 21. A method according to any of paragraphs 14 to 20, wherein the second message comprises a list of one or more network slice identifiers, and the indication of the second portion of the temporary identifier comprises a network slice identifier at a predetermined position in the list.

Paragraph 22. A method according to paragraph 21, wherein the network slice identifier at the predetermined position in the list is associated with an access and mobility management function, AMF, in a core network of the wireless telecommunications network with which the terminal device has established a protocol data unit, PDU, session.

Paragraph 23. A method according to any of paragraphs 14 to 22, wherein the second message comprises a indication of a protocol data unit, PDU, session identity, and the indication of the second portion of the temporary identifier comprises the indication of a protocol data unit, PDU, session identity.

Paragraph 24. A method according to any of paragraphs 14 to 20, wherein the indication of the second portion of the temporary identifier comprises one of a tracking area identifier, an identifier of an access and mobility management function, AMF, in the core network with which the terminal device is registered, and an identifier of a group of access and mobility management functions, the group including the access and mobility management function with which the terminal device is registered.

Paragraph 25. A method according to any of paragraphs 14 to 24, the method comprising: receiving a random access request message transmitted by the terminal device on a random access channel, and transmitting a random access response message in response to the random access request message, wherein the first message is transmitted by the terminal device in response to receiving the random access response message.

Paragraph 26. A method according to any of paragraphs 14 to 25, wherein the temporary identifier is one of a system architecture evolution-temporary mobile subscriber identity, S-TMSI, and a 5G-S-TMSI, comprising at least 48 bits.

Paragraph 27. A terminal device for establishing a radio connection with network infrastructure equipment in a wireless telecommunications network, wherein the terminal device is associated with a previously-allocated temporary identifier that identifies the terminal device within the wireless telecommunications network; wherein the terminal device comprises controller circuitry and transceiver circuitry configured such that the terminal device is operable to: transmit a first message to the network infrastructure equipment comprising an indication of a first portion of the temporary identifier; and transmit a second message, which is separate from the first message, to the network infrastructure equipment comprising an indication of a second portion of the temporary identifier.

Paragraph 28. Circuitry for a terminal device for establishing a radio connection with network infrastructure equipment in a wireless telecommunications network, wherein the terminal device is associated with a previously-allocated temporary identifier that identifies the terminal device within the wireless telecommunications network; wherein the circuitry comprises controller circuitry and transceiver circuitry configured such that the terminal device is operable to: transmit a first message to the network infrastructure equipment comprising an indication of a first portion of the temporary identifier; and transmit a second message, which is separate from the first message, to the network infrastructure equipment comprising an indication of a second portion of the temporary identifier.

Paragraph 29. A network infrastructure equipment for establishing a radio connection with a terminal device in a wireless telecommunications network, wherein the terminal device is associated with a previously-allocated temporary identifier that identifies the terminal device within the wireless telecommunications network, wherein the infrastructure equipment comprises controller circuitry and transceiver circuitry configured such that the infrastructure equipment is operable to: receive a first message from the terminal device comprising an indication of a first portion of the temporary identifier; and receive a second message, which is separate from the first message, from the terminal device comprising an indication of a second portion of the temporary identifier.

Paragraph 30. Circuitry for a network infrastructure equipment for establishing a radio connection with a terminal device in a wireless telecommunications network, wherein the terminal device is associated with a previously-allocated temporary identifier that identifies the terminal device within the wireless telecommunications network, wherein the circuitry comprises controller circuitry and transceiver circuitry configured such that the infrastructure equipment is operable to: receive a first message from the terminal device comprising an indication of a first portion of the temporary identifier; and receive a second message, which is separate from the first message, from the terminal device comprising an indication of a second portion of the temporary identifier.

REFERENCES

[1] RP-161464, "Revised WID for Further Enhanced MTC for LTE," Ericsson, 3GPP TSG RAN Meeting #73, New Orleans, USA, Sep. 19-22, 2016

[2] RP-161901, "Revised work item proposal: Enhancements of NB-IoT", Huawei, HiSilicon, 3GPP TSG RAN Meeting #73, New Orleans, USA, Sep. 19-22, 2016

[3] RP-170732, "New WID on Even further enhanced MTC for LTE," Ericsson, Qualcomm, 3GPP TSG RAN Meeting #75, Dubrovnik, Croatia, Mar. 6-9, 2017

[4] RP-170852, "New WID on Further NB-IoT enhancements," Huawei, HiSilicon, Neul, 3GPP TSG RAN Meeting #75, Dubrovnik, Croatia, Mar. 6-9, 2017

[5] Holma H. and Toskala A, "LTE for UMTS OFDMA and SC-FDMA based radio access", John Wiley and Sons, 2009

The invention claimed is:

1. A method of operating a terminal device to establish a radio connection with network infrastructure equipment in a wireless telecommunications network,
wherein the terminal device is associated with a previously-allocated temporary identifier that identifies the terminal device within the wireless telecommunications network; the method comprising:
transmitting a first message to the network infrastructure equipment comprising
a first indication of a first portion of the previously-allocated temporary identifier, the first portion of the previously-allocated temporary identifier being less than all of the previously-allocated temporary identifier; and
after said transmitting the first message, transmitting a second message, which is separate from the first message, to the network infrastructure equipment comprising
a second indication of a second portion of the previously-allocated temporary identifier, the second portion of the previously-allocated temporary identifier being less than all of the previously-allocated temporary identifier,
wherein the previously-allocated temporary identifier comprises at least 48 bits.

2. A method according to claim 1, wherein the second message comprises a request for a service from a core network of the wireless telecommunications network.

3. A method according to claim 1, wherein the first message is transmitted as part of a random access contention resolution procedure.

4. A method according to claim 1, wherein the second message is transmitted after the completion of a contention resolution procedure.

5. A method according to claim 1, wherein
the size of the first message is predetermined, and
the size of the second message is greater than the size of the first message and is not predetermined.

6. A method according to claim 1, wherein the second portion of the previously-allocated temporary identifier is a remaining part of the previously-allocated temporary identifier that was not part of the first portion of the previously-allocated temporary identifier.

7. A method according to claim 1, wherein
the second message comprises a list of one or more network slice identifiers, and
the second indication of the second portion of the previously-allocated temporary identifier comprises a network slice identifier at a predetermined position in the list.

8. A method according to claim 7, wherein the network slice identifier at the predetermined position in the list is associated with an access and mobility management function (AMF) in a core network of the wireless telecommunications network with which the terminal device has established a protocol data unit (PDU) session.

9. A method according to claim 1, wherein
the second message comprises a third indication of a protocol data unit (PDU) session identity, and
the second indication of the second portion of the previously-allocated temporary identifier comprises the third indication of the PDU session identity.

10. A method according to claim 1, wherein the second indication of the second portion of the previously-allocated temporary identifier comprises one of a tracking area identifier, a first identifier of an access and mobility management function (AMF) in a core network of the wireless telecommunications network with which the terminal device is registered, and a second identifier of a group of access and mobility management functions, the group including the access and mobility management function with which the terminal device is registered.

11. A method according to claim 1, the method comprising:
transmitting a random access request message on a random access channel to the network infrastructure equipment of the wireless telecommunications network, and
receiving a random access response message from the network infrastructure equipment, wherein the first message is transmitted in response to receiving the random access response message.

12. A method according to claim 1, further comprising the terminal device determining a size for the first indication of the first portion of the previously-allocated temporary identifier based on a size of the first message.

13. A method according to claim 1, wherein the previously-allocated temporary identifier is one of a system architecture evolution-temporary mobile subscriber identity, S-TMSI, and a 5G-S-TMSI.

14. A method of operating a network infrastructure equipment of a wireless telecommunications network to establish a radio connection with a terminal device,
wherein the terminal device is associated with a previously-allocated temporary identifier that identifies the terminal device within the wireless telecommunications network, the method comprising:
receiving a first message from the terminal device comprising a first indication of a first portion of the previously-allocated temporary identifier, the first portion of the previously-allocated temporary identifier being less than all of the previously-allocated temporary identifier; and
after said receiving the first message, receiving a second message, which is separate from the first message, from the terminal device comprising
a second indication of a second portion of the previously-allocated temporary identifier, the second portion of the previously-allocated temporary identifier being less than all of the previously-allocated temporary identifier,
wherein the previously-allocated temporary identifier comprises at least 48 bits.

15. A method according to claim 14, wherein the first message is transmitted as part of a random access contention resolution procedure.

16. A method according to claim 14, wherein the second message is transmitted after the completion of a contention resolution procedure.

17. A method according to claim 14, wherein
the size of the first message is predetermined, and
the size of the second message is greater than the size of the first message and is not predetermined.

18. A method according to claim 14, wherein the second message is an RRC connection setup complete message.

19. A method according to claim 14, wherein the second message comprises a request for a service from a core network of the wireless telecommunications network.

20. A method according to claim 19, the method comprising:
determining an identity of an access and mobility management function (AMF) in the core network based on the first indication of the first portion of the previously-allocated temporary identifier and the second indication of the second portion of the previously-allocated temporary identifier, and
transmitting the request for the service to the identified access and mobility management function.

21. A method according to claim 14, wherein
the second message comprises a list of one or more network slice identifiers, and
the second indication of the second portion of the previously-allocated temporary identifier comprises a network slice identifier at a predetermined position in the list.

22. A method according to claim 21, wherein the network slice identifier at the predetermined position in the list is associated with an access and mobility management function (AMF) in a core network of the wireless telecommunications network with which the terminal device has established a protocol data unit (PDU) session.

23. A method according to claim 14, wherein
the second message comprises a third indication of a protocol data unit (PDU) session identity, and
the second indication of the second portion of the previously-allocated temporary identifier comprises the third indication of the PDU session identity.

24. A method according to claim 14, wherein the second indication of the second portion of the previously-allocated temporary identifier comprises one of a tracking area identifier, a first identifier of an access and mobility management function (AMF) in the core network with which the terminal device is registered, and a second identifier of a group of access and mobility management functions, the group including the access and mobility management function with which the terminal device is registered.

25. A method according to claim 14, the method comprising:
receiving a random access request message transmitted by the terminal device on a random access channel, and
transmitting a random access response message in response to the random access request message, wherein
the first message is transmitted by the terminal device in response to receiving the random access response message.

26. A method according to claim 14, wherein the previously-allocated temporary identifier is one of a system architecture evolution-temporary mobile subscriber identity, S-TMSI, and a 5G-S-TMSI.

27. A terminal device for establishing a radio connection with network infrastructure equipment in a wireless telecommunications network,
wherein the terminal device is associated with a previously-allocated temporary identifier that identifies the terminal device within the wireless telecommunications network; wherein the terminal device comprises controller circuitry and transceiver circuitry configured such that the terminal device is operable to:
transmit a first message to the network infrastructure equipment comprising
a first indication of a first portion of the previously-allocated temporary identifier, the first portion of the previously-allocated temporary identifier being less than all of the previously-allocated temporary identifier; and
after transmitting the first message, transmit a second message, which is separate from the first message, to the network infrastructure equipment comprising
a second indication of a second portion of the previously-allocated temporary identifier, the second portion of the previously-allocated temporary identifier being less than all of the previously-allocated temporary identifier,
wherein the previously-allocated temporary identifier comprises at least 48 bits.

28. Circuitry for a terminal device for establishing a radio connection with network infrastructure equipment in a wireless telecommunications network,
wherein the terminal device is associated with a previously-allocated temporary identifier that identifies the terminal device within the wireless telecommunications network;

wherein the circuitry comprises controller circuitry and transceiver circuitry configured such that the terminal device is operable to:

transmit a first message to the network infrastructure equipment comprising a first indication of a first portion of the previously-allocated temporary identifier, the first portion of the previously-allocated temporary identifier being less than all of the previously-allocated temporary identifier; and after transmitting the first message, transmit a second message, which is separate from the first message, to the network infrastructure equipment comprising a second indication of a second portion of the previously-allocated temporary identifier, the second portion of the previously-allocated temporary identifier being less than all of the previously-allocated temporary identifier, wherein the previously-allocated temporary identifier comprises 48 bits or more.

29. A network infrastructure equipment for establishing a radio connection with a terminal device in a wireless telecommunications network, wherein the terminal device is associated with a previously-allocated temporary identifier that identifies the terminal device within the wireless telecommunications network, wherein the infrastructure equipment comprises controller circuitry and transceiver circuitry configured such that the infrastructure equipment is operable to:

receive a first message from the terminal device comprising a first indication of a first portion of the previously-allocated temporary identifier, the first portion of the previously-allocated temporary identifier being less than all of the previously-allocated temporary identifier; and after receiving the first message, receive a second message, which is separate from the first message, from the terminal device comprising a second indication of a second portion of the previously-allocated temporary identifier, the second portion of the previously-allocated temporary identifier being less than all of the previously-allocated temporary identifier, wherein the previously-allocated temporary identifier comprises at least 48 bits.

30. Circuitry for a network infrastructure equipment for establishing a radio connection with a terminal device in a wireless telecommunications network, wherein the terminal device is associated with a previously-allocated temporary identifier that identifies the terminal device within the wireless telecommunications network, wherein the circuitry comprises controller circuitry and transceiver circuitry configured such that the infrastructure equipment is operable to:

receive a first message from the terminal device comprising a first indication of a first portion of the previously-allocated temporary identifier, the first portion of the previously-allocated temporary identifier being less than all of the previously-allocated temporary identifier; and after receiving the first message, receive a second message, which is separate from the first message, from the terminal device comprising a second indication of a second portion of the previously-allocated temporary identifier, the second portion of the previously-allocated temporary identifier being less than all of the previously-allocated temporary identifier, wherein the previously-allocated temporary identifier comprises 48 bits or more.

\* \* \* \* \*